United States Patent
Wakita et al.

(10) Patent No.: US 10,764,334 B2
(45) Date of Patent: Sep. 1, 2020

(54) COMMUNICATION SYSTEM, MOVING OBJECT, AND COMMUNICATION METHOD

(71) Applicant: HONDA MOTOR CO., LTD., Minato-ku, Tokyo (JP)

(72) Inventors: Kazuyoshi Wakita, Sakura (JP); Michitaka Tsuboi, Utsunomiya (JP); Makoto Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 15/876,290

(22) Filed: Jan. 22, 2018

(65) Prior Publication Data
US 2018/0213006 A1 Jul. 26, 2018

(30) Foreign Application Priority Data
Jan. 23, 2017 (JP) .................................. 2017-009309

(51) Int. Cl.
*H04L 29/06* (2006.01)
*H04W 12/06* (2009.01)
*H04L 29/08* (2006.01)

(52) U.S. Cl.
CPC .......... *H04L 63/205* (2013.01); *H04L 63/126* (2013.01); *H04L 63/20* (2013.01); *H04L 67/12* (2013.01); *H04W 12/06* (2013.01)

(58) Field of Classification Search
CPC ..... H04L 63/205; H04L 63/126; H04L 63/20; H04L 67/12
(Continued)

(56) References Cited

U.S. PATENT DOCUMENTS

| 9,419,802 B2* | 8/2016 | Lortz | G06F 15/177 |
| 2008/0184026 A1* | 7/2008 | Hall | G06F 21/10 |
| | | | 713/100 |

(Continued)

FOREIGN PATENT DOCUMENTS

| CN | 101444119 | 5/2009 |
| CN | 102835071 | 12/2012 |

(Continued)

OTHER PUBLICATIONS

Japanese Office Action for Japanese Patent Application No. 2017-009309 dated Jun. 18, 2019.

(Continued)

*Primary Examiner* — Dant B Shaifer Harriman
(74) *Attorney, Agent, or Firm* — Amin, Turocy & Watson, LLP (57) ABSTRACT

A communication system includes a communication device configured to execute a process related to a cyber security solution in accordance with policy information defining execution details of the process related to the cyber security solution. The communication system includes a change unit configured to change the policy information, wherein the change unit changes the policy information after a state of the communication device in a process of manufacturing the communication system transitions from a first state where the communication device is mounted to the communication system to a second state where a predetermined process is executed thereafter so that the execution details of the process related to the cyber security solution in the second state are expanded more than the execution details in the first state.

13 Claims, 5 Drawing Sheets

| VERIFICATION EXECUTION ITEM | ASSEMBLY PROCESS | INITIAL INFORMATION SETTING PROCESS | | VEHICLE INSPECTION PROCESS | |
|---|---|---|---|---|---|
| | | VARIOUS TYPES OF SETTINGS (CSS PROCESS INVALIDATION STATE) | VERIFICATION OF CSS PROCESS | FUNCTION VERIFICATION TEST, OVERLOAD TEST, OR THE LIKE | AFTER COMPLETION OF OVERLOAD TEST |
| · SECRET COMMUNICATION<br>· MESSAGE AUTHENTICATION<br>· DEVICE AUTHENTICATION | DO NOT EXECUTE | DO NOT EXECUTE | EXECUTE | EXECUTE | EXECUTE |
| CYCLE ABNORMALITY DETECTION | DO NOT EXECUTE | DO NOT EXECUTE | DO NOT EXECUTE | DO NOT EXECUTE | EXECUTE |

(58) Field of Classification Search
USPC .......................................................... 726/1
See application file for complete search history.

(56) References Cited

U.S. PATENT DOCUMENTS

| | | | | |
|---|---|---|---|---|
| 2008/0301779 | A1* | 12/2008 | Garg | H04L 63/101 |
| | | | | 726/4 |
| 2015/0095970 | A1* | 4/2015 | Shetty | H04L 63/0209 |
| | | | | 726/1 |
| 2016/0294855 | A1* | 10/2016 | Maeda | H04L 12/28 |
| 2017/0085537 | A1* | 3/2017 | Benedek | H04L 63/062 |
| 2018/0213006 | A1* | 7/2018 | Wakita | H04L 63/205 |
| 2019/0281052 | A1* | 9/2019 | Lekkas | H04L 63/20 |

FOREIGN PATENT DOCUMENTS

| | | |
|---|---|---|
| JP | 2005-012274 | 1/2005 |
| JP | 2014-143620 | 8/2014 |
| JP | 2015-005218 | 1/2015 |

OTHER PUBLICATIONS

Yumoto, "Test Strategy Drawing Out Power of Field", Software Test Symposium 2010 Hokkaido (JaSST' 10 Hokkaido) Lecture materials Oct. 1, 2010 [Search date: Jun. 6, 2019] http://www/jasst.jp/archives/jasstOs/pdf/S1.pdf.

Japanese Office Action for Japanese Patent Application No. 2017-009309 dated Jan. 22, 2019.

Kitani, et al. "Development of Data Communication Method In-Vehicle Network for Automated Driving", Report of Information Processing Society Research, Information Processing Society of Japan, Jan. 21, 2016, pp. 1-8.

Bessho, et al. "Experimental Study of Frame Preemption for Ultra Low Latency Network", Report of IEICE Technical Research, The Institute of Electronics, Information, and Communication Engineers, Jan. 14, 2016, vol. 115, No. 404, pp. 97-102.

Japanese Office Action for Japanese Patent Application No. 2017-009309 dated Jul. 3, 2018.

The University of New Hampshire InterOperability Laboratory (UNH-IOL), "Ethernet Switching Protocols—Filtering Database Conformance Test Suite", The University of New Hampshire, Jun. 13, 2016, Version 2.1, p. 27, 42.

Nakano, et al. "Vehicle Information Security", Nikkei Business Publications, Inc., Dec. 27, 2013, First Edition, pp. 148-155.

Chinese Office Action for Chinese Patent Application No. 201810052917.4 dated May 11, 2020.

* cited by examiner

| VERIFICATION EXECUTION ITEM | ASSEMBLY PROCESS | INITIAL INFORMATION SETTING PROCESS | | VEHICLE INSPECTION PROCESS | |
|---|---|---|---|---|---|
| | | VARIOUS TYPES OF SETTINGS (CSS PROCESS INVALIDATION STATE) | VERIFICATION OF CSS PROCESS | FUNCTION VERIFICATION TEST, OVERLOAD TEST, OR THE LIKE | AFTER COMPLETION OF OVERLOAD TEST |
| • SECRET COMMUNICATION<br>• MESSAGE AUTHENTICATION<br>• DEVICE AUTHENTICATION | DO NOT EXECUTE | DO NOT EXECUTE | EXECUTE | EXECUTE | EXECUTE |
| CYCLE ABNORMALITY DETECTION | DO NOT EXECUTE | DO NOT EXECUTE | DO NOT EXECUTE | DO NOT EXECUTE | EXECUTE |

COMMUNICATION SYSTEM, MOVING OBJECT, AND COMMUNICATION METHOD

CROSS-REFERENCE TO RELATED APPLICATION

Priority is claimed on Japanese Patent Application No. 2017-009309, filed Jan. 23, 2017, the content of which is incorporated herein by reference.

BACKGROUND OF THE INVENTION

Field of the Invention

The present invention relates to a communication system, a moving object, and a communication method.

Description of Related Art

In recent years, communication via a communication system has been required to satisfy a desired security policy. The security policy of each communication device included in the communication system may be set when manufacturing the communication system so that such a security policy is satisfied. Technology for setting the security policy of a communication device is known (for example, see Japanese Unexamined Patent Application, First Publication No. 2014-143620 (hereinafter referred to as Patent Document 1). According to Patent Document 1, a temporarily set security policy of a communication device is disclosed as being related to a gateway which changes in accordance with a property of a connection target.

SUMMARY OF THE INVENTION

However, if the security policy required in the step of manufacturing the communication system is different from the security policy required at the completion of manufacturing, it is necessary to change the security policy of the communication device included in the communication system at the manufacturing stage. Even if the technology described in Patent Document 1 is applied to the manufacturing process, it may be difficult to change the security policy of the communication device.

An aspect according to the present invention has been made in view of such circumstances, and an objective of the aspect according to the present invention is to provide a communication system, a moving object, and a communication method capable of more easily setting a security policy in a manufacturing process.

In order to achieve the above-described objective, the present invention adopts the following aspects.

(1) A communication system of the present invention is a communication system including a communication device configured to execute a process related to a cyber security solution in accordance with policy information defining execution details of the process related to the cyber security solution, the communication system including: a change unit configured to change the policy information, wherein the change unit changes the policy information after a state of the communication device in a process of manufacturing the communication system transitions from a first state where the communication device is mounted to the communication system to a second state where a predetermined process is executed thereafter so that the execution details of the process related to the cyber security solution in the second state are expanded more than the execution details in the first state.

According to the above-described aspect (1), the communication system changes the policy information so that the execution details of the process related to the cyber security solution in the second state are expanded more than the execution details in the first state after the state of the communication device in the manufacturing process transitions from the first state in which the communication device is mounted to the second state in which the predetermined process is executed thereafter.

(2) In the above-described aspect (1), the communication system may include a storage unit configured to store the policy information defining details of the process related to the cyber security solution of at least any of secret communication, message authentication, and device authentication, wherein the change unit rewrites the policy information in the process of manufacturing the communication system.

(3) In the above-described aspect (1) or (2), the communication device may be able to execute secret communication with another communication device as the process related to the cyber security solution, and the change unit may change the policy information so that the secret communication is added to execution details after transition to a state in which a process of writing encryption information for the secret communication to a storage unit is completed.

(4) In any one of the above-described aspects (1) to (3), the communication device may be able to execute message authentication for communication with another communication device as the process related to the cyber security solution, and the change unit may change the policy information so that the message authentication is added to execution details after transition to a state in which a process of writing authentication information for the message authentication to a storage unit is completed.

(5) In any one of the above-described aspects (1) to (4), the communication device may be able to execute device authentication on another communication device as the process related to the cyber security solution, and the change unit may change the policy information so that the device authentication is added to execution details after transition to a state in which a process of writing authentication information for the device authentication to a storage unit is completed.

(6) In any one of the above-described aspects (1) to (5), the communication device may be mounted in a vehicle and may be able to execute monitoring of an improper state based on a number of received signals detected in the communication as the cyber security solution, and the change unit may change the policy information so that the monitoring of the improper state in the communication is added to execution details after transition to a state in which a process of inspecting the vehicle is completed.

(7) In any one of the above-described aspects (1) to (5), the communication device may be able to execute message authentication for communication with another communication device and monitoring of an improper state based on a number of received signals detected in the communication as the process related to the cyber security solution, the change unit may change the policy information so that the message authentication is added to execution details after transition to a state in which a process of writing authentication information for the message authentication to a storage unit is completed, and the change unit may further change the policy information so that the monitoring of the improper state in the communication is added to execution details after transition to a state in which an inspection process, which is executed upon completion of the transition to the state in which the process of writing the authentication information for the message authentication to the storage unit, is completed.

(8) In any one of the above-described aspects (1) to (5), the communication device may be able to execute secret communication with another communication device and monitoring of an improper state based on a number of received signals detected in the communication as the process related to the cyber security solution, the change unit may change the policy information so that the secret communication is added to execution details after transition to a state in which a process of writing encryption information for the secret communication to a storage unit is completed, and the change unit may further change the policy information so that the monitoring of the improper state in the communication is added to execution details after transition to a state in which an inspection process, which is executed upon completion of the transition to the state in which the process of writing the encryption information for the secret communication to the storage unit, is completed.

(9) In any one of the above-described aspects (1) to (5), the communication device may be able to execute device authentication on another communication device and monitoring of an improper state based on a number of received signals detected in the communication as the process related to the cyber security solution, the change unit may change the policy information so that the device authentication on the other communication device is added to execution details after transition to a state in which a process of writing authentication information for the device authentication to a storage unit is completed, and the change unit may be further change the policy information so that the monitoring of the improper state in the communication is added to execution details after transition to a state in which an inspection process, which is executed upon completion of the transition to the state in which the process of writing the authentication information for the device authentication to the storage unit, is completed.

(10) In any one of the above-described aspects (1) to (5), the communication device may include a monitoring unit configured to monitor an improper state in communication of the communication device on the basis of a number of communication signals of the communication device.

(11) In any one of the above-described aspects (1) to (10), the communication system may include a plurality of communication devices mounted in a common housing.

(12) A moving object according to an aspect of the present invention includes the communication system according to any one of the above-described aspects (1) to (11); and a driving unit configured to drive a housing in which the communication system is mounted.

(13) A communication method according to an aspect of the present invention is a communication method for use in a communication system including a communication device configured to execute a process related to a cyber security solution in accordance with policy information defining execution details of the process related to the cyber security solution, the communication method including: changing the policy information after a state of the communication device in a process of manufacturing the communication system transitions from a first state where the communication device is mounted to the communication system to a second state where a predetermined process is executed thereafter so that the execution details of the process related to the cyber security solution in the second state are expanded more than the execution details in the first state.

According to an aspect according to the present invention, a communication system of the present invention is a communication system including a communication device configured to execute a process related to a cyber security solution in accordance with policy information defining execution details of a process related to the cyber security solution, the communication system including: a change unit configured to change the policy information, wherein the change unit changes the policy information so that execution details of a process related to the cyber security solution in a second state are expanded more than execution details in a first state after a state of the communication device in a process of manufacturing the communication system transitions from the first state in which the communication device is mounted to the second state in which a predetermined process is executed thereafter, so that it is possible to more easily set a security policy in the manufacturing process.

DETAILED DESCRIPTION OF THE INVENTION

Hereinafter, embodiments of a communication system, a moving object, and a communication method of the present invention will be described with reference to the drawings.

First Embodiment

Figure 1:
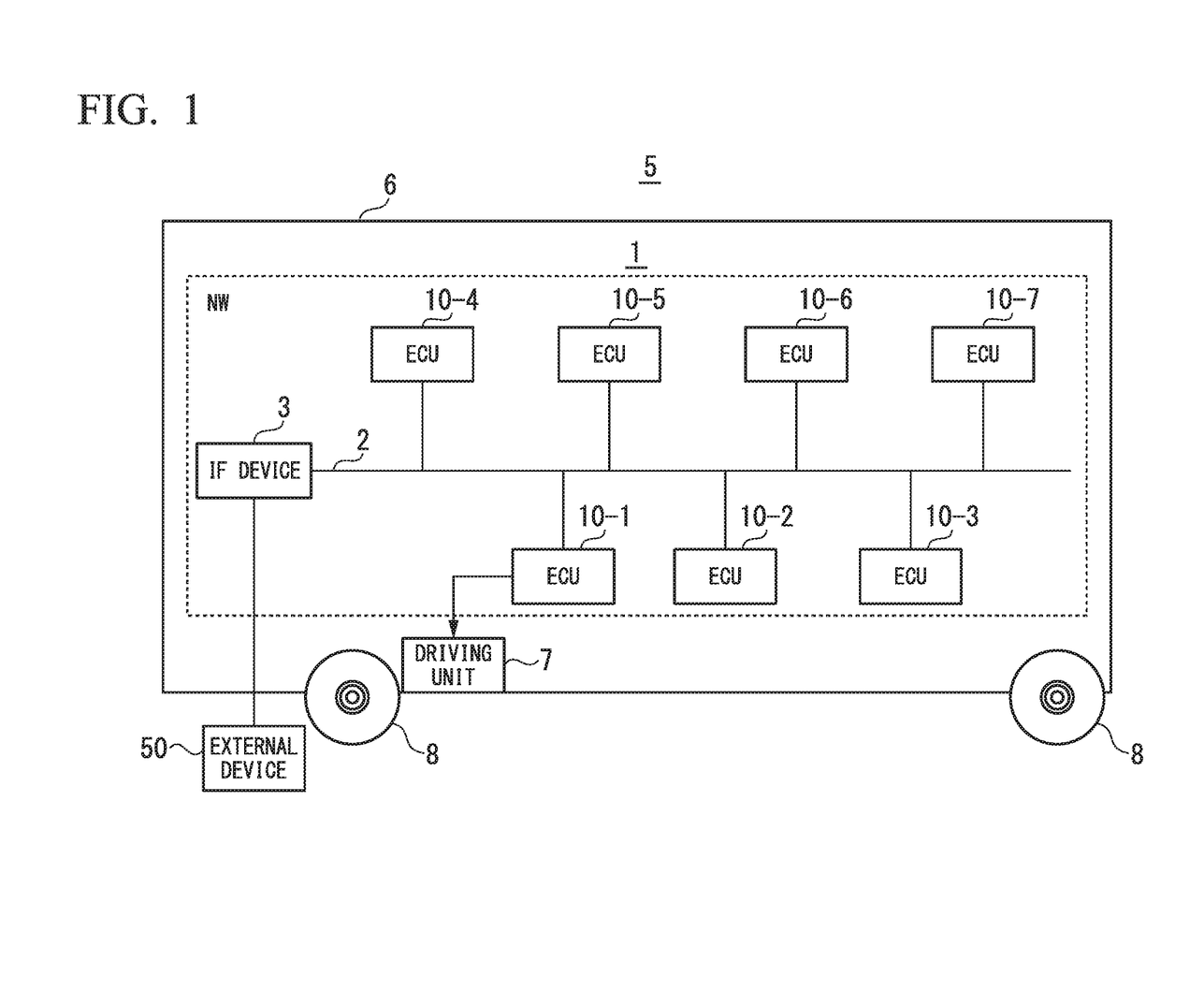
FIG. 1 is a diagram illustrating a configuration of a communication system 1 of the present embodiment.

FIG. 1 is a diagram illustrating a configuration of a communication system 1 of the present embodiment. For example, the communication system 1 is mounted in a vehicle 5. The vehicle 5 is an example of a moving object. For example, the vehicle 5 includes at least a housing (a vehicle body) 6, a driving unit 7, wheels 8 driven by the driving unit 7, and the communication system 1. The driving unit 7 includes an engine or a motor.

The communication system 1 constitutes at least a network NW in the vehicle. In the network NW, for example, communication based on a controller area network (CAN) or a communication scheme such as IEEE 802.3 is executed via a bus 2.

The communication system 1 includes ECUs 10-1 to 10-7 connected to the bus 2.

Hereinafter, if the ECUs 10-1 to 10-7 are not distinguished from one another, they are simply referred to as an ECU 10. Although devices such as the ECUs 10 will be described as being connected to the common bus 2, they may be connected to different buses communicably connected by a relay device (not illustrated) or the like.

Figure 3:
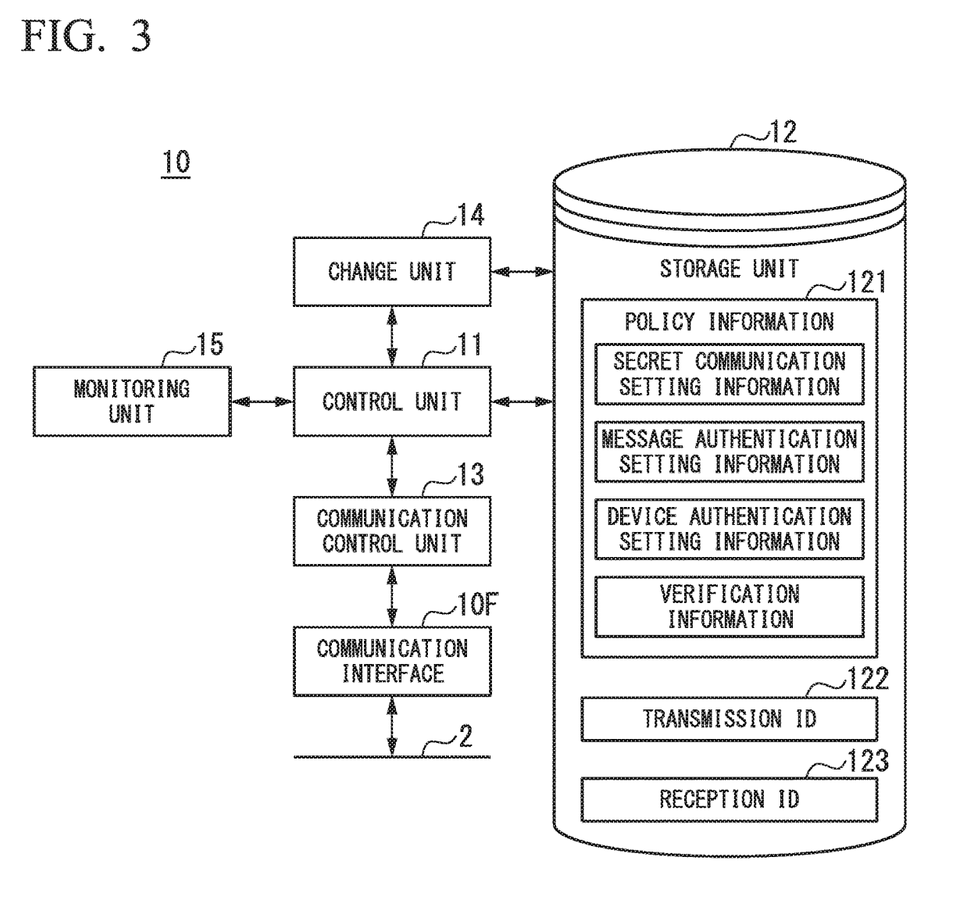
FIG. 3 is a diagram illustrating a functional configuration of the ECU 10 of the present embodiment.

For example, the ECU 10-1 is a driving unit ECU configured to control the driving unit 7, and the ECU-2 is a seat belt ECU configured to control a seat belt or the like. The ECU 10 receives a frame transmitted to the network NW to which the ECU 10 belongs. Hereinafter, each frame transmitted to the network NW is referred to as a frame F. The frame F is identified by an identifier (hereinafter referred to as ID) attached to each frame. The ECU 10 stores an ID (hereinafter referred to as a reception ID 123) for identifying the frame F of the ECU 10 in the storage unit 12 (FIG. 3). When the frame F is received, the ECU 10 refers to the ID attached to the received frame F (hereinafter referred to as the transmission ID 122) and extracts and acquires the frame F to which a transmission ID 122 having the same value as the reception ID 123 is attached. The ECU 10 executes an authentication process (device authentication) of a communication partner during mutual communication.

The network NW is provided with an interface device (IF device) 3 provided with a data link connector (DLC) which is a terminal for connecting an external device 50 such as a verification device. The interface device 3 includes a connection terminal (DLC) for communicating with the external device 50. A verification device or the like connected to the interface device 3 at the time of vehicle inspection or the like is an example of the external device 50. The verification device communicates with the ECU 10 connected to the bus 2 to inspect and verify a state of the communication system 1. It is possible to cause the communication system 1 to function without connecting a verification device or the like to the interface device 3, except for during a vehicle manufacturing process, a vehicle inspection time, and the like.

Also, the vehicle 5 illustrated in FIG. 1 includes at least the housing (the vehicle body) 6, the driving unit 7, the wheels 8 to be driven by the driving unit 7, and the communication system 1.

Figure 2:
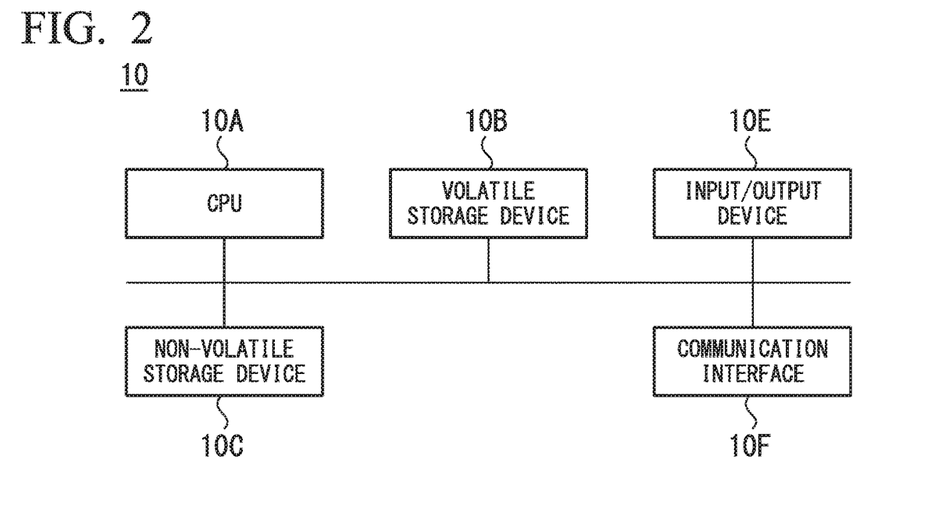
FIG. 2 is a diagram illustrating a hardware configuration of an electronic control unit (ECU) 10 of the present embodiment.

FIG. 2 is a diagram illustrating a hardware configuration of the ECU 10 according to the present embodiment. The ECU 10 is a computer including a CPU 10A, a nonvolatile storage device 10C such as a read only memory (ROM), an electrically erasable and programmable read only memory (EEPROM), or a hard disk drive (HDD), a volatile storage device 10B such as a random access memory (RAM) or a register, a wireless communication interface 10D, an input/output device 10E, a communication interface 10F, and the like. The ECU 10 may not include either one or both of the wireless communication interface 10D and the input/output device 10E according to a type or a field of application thereof.

FIG. 3 is a diagram illustrating a functional configuration of the ECU 10 according to the present embodiment. The ECU 10 includes a control unit 11, a storage unit 12, a communication control unit 13, a change unit 14, and a monitoring unit 15. For example, the control unit 11, the communication control unit 13, the change unit 14, and the monitoring unit 15 are implemented by a processor such as the CPU 10A executing a program.

The control unit 11 controls parts including the communication control unit 13. For example, the control unit 11 accepts a communication request from another device such as another ECU 10, the IF device 3, the external device 50, or the like and performs an authentication process on the other device in response to the communication request from the other device. Hereinafter, the control of a cyber security solutions (CSS) process (a processing related to a cyber security solution) by the control unit 11 will be mainly described.

The storage unit 12 is implemented by the nonvolatile storage device 10C and the volatile storage device 10B. The storage unit 12 stores a program such as an application program or a communication control program, and various types of information referred to by execution of the above programs. For example, various types of information include policy information 121, a transmission ID 122, a reception ID 123, and the like. The policy information 121 defines details to be executed as the CSS process in the communication system 1.

The policy information 121 may include information defining details of the CSS process of at least any of secret communication, message authentication, and device authentication, but the present invention is not limited thereto. Secret communication setting information, message authentication setting information, and device authentication setting information are examples of information that defines details of the CSS process.

Further, the policy information 121 may include verification information for adjusting the verification function, but the present invention is not limited thereto.

The communication control unit 13 controls communication with an external device via the communication interface 10F. The communication interface 10F is an interface for connecting the ECU 10 to the bus 2.

The communication control unit 13 controls the communication interface 10F to enable communication with other devices requested by the control unit 11. The communication control unit 13 receives the notification from the communication interface 10F and notifies the control unit 11 of a communication request from another device. Whether or not the communication request is for a communication request from another device is determined according to the authentication process in the control unit 11 or the like.

For example, the change unit 14 changes and rewrites the policy information 121 stored in the storage unit 12 on the basis of information acquired from the external device 50 or information reported via the other ECU 10. By changing the above policy information 121, for example, the change unit 14 is configured so that execution details of a process (the CSS process) related to the cyber security solution in a second state are expanded more than execution details in a first state after a state of the ECU 10 (the communication device) in a process of manufacturing the communication system 1 transitions from the first state in which the ECU 10 is mounted to the second state in which a predetermined process is executed thereafter. Details of the CSS process of the change unit 14 will be described below.

The monitoring unit 15 monitors an improper state in communication. For example, the monitoring unit 15 determines that the state is an improper state if the number of items or a frequency per unit time is greater than or equal to a predetermined value which is predefined on the basis of the number of received signals.

As described above, the communication system 1 includes the ECU 10 configured to execute the CSS process in accordance with the policy information 121 that defines the execution content of the CSS process.

Next, an outline of the process of manufacturing the vehicle 5 will be described.

Figure 4:
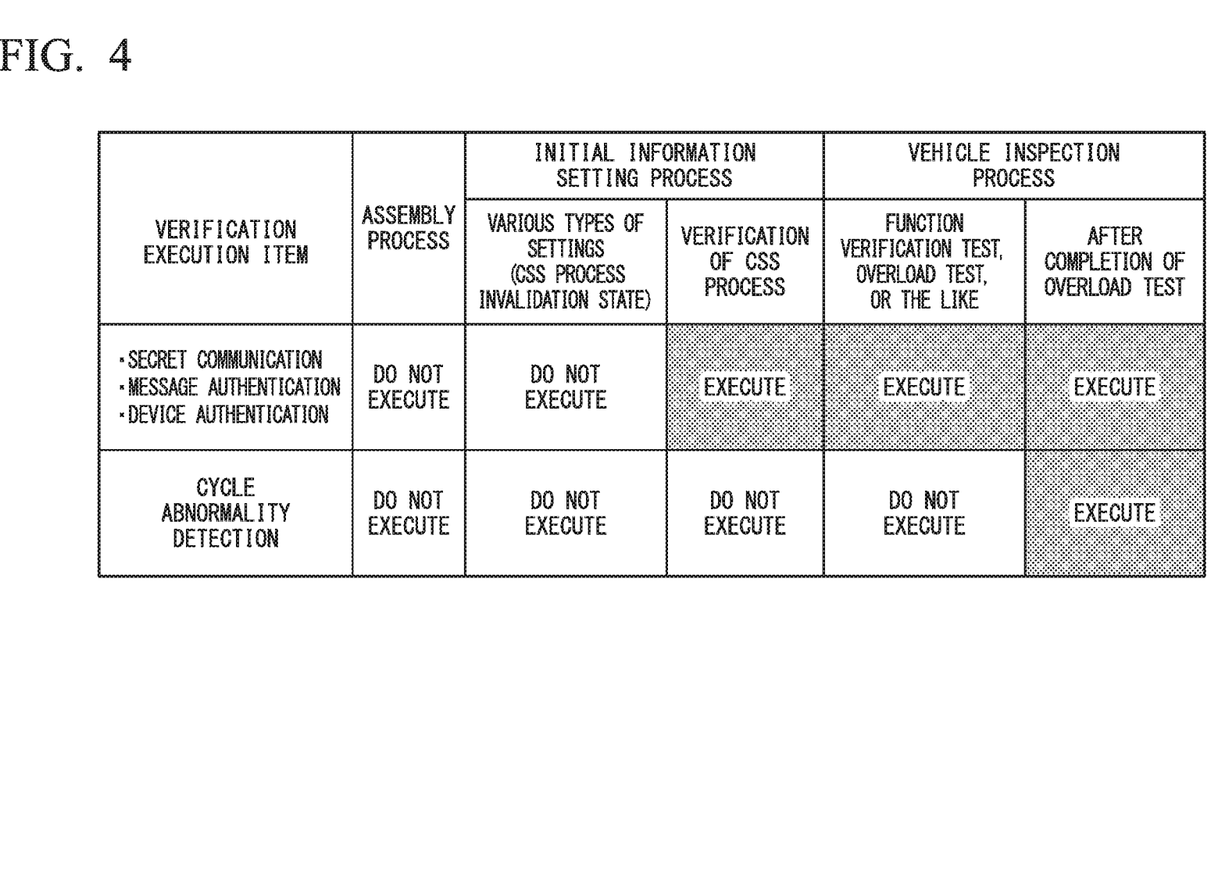
FIG. 4 is a diagram illustrating a manufacturing process according to the present embodiment and execution control of an authentication process and a verification process in each step of the manufacturing process.

FIG. 4 is a diagram illustrating the manufacturing process according to the present embodiment and the execution control of the authentication process and the verification process in each step of the manufacturing process. A table illustrated in FIG. 4 shows a subdivided manufacturing process. The entire manufacturing process is roughly divided into three categories: "(1) assembly wiring process," "(2) process of setting initial information of electrical components", and "(3) vehicle inspection process." Each of "(2) process of setting initial information of electrical components" and "(3) vehicle inspection process" is further divided into two.

For example, "(2) process of setting initial information of electrical components" includes a "process of executing various settings" and a "process of verifying the CSS process." The "process of verifying the CSS process" is assigned to a step after transition to a state in which the CSS process is executed (a validated state).

For example, "(3) vehicle inspection process" includes a "process of executing various types of settings" and a "process of verifying the CSS process." The "process of verifying the CSS process" is assigned to a step after the transition to the state in which the CSS process is executed (a validated state).

The presence or absence of execution of the authentication process and the verification process in each process is indicated. The target authentication process includes, for example, authentication items such as message authentication, secret communication, and device authentication. The target verification process includes a detection item such as cycle abnormality detection.

Figure 5:
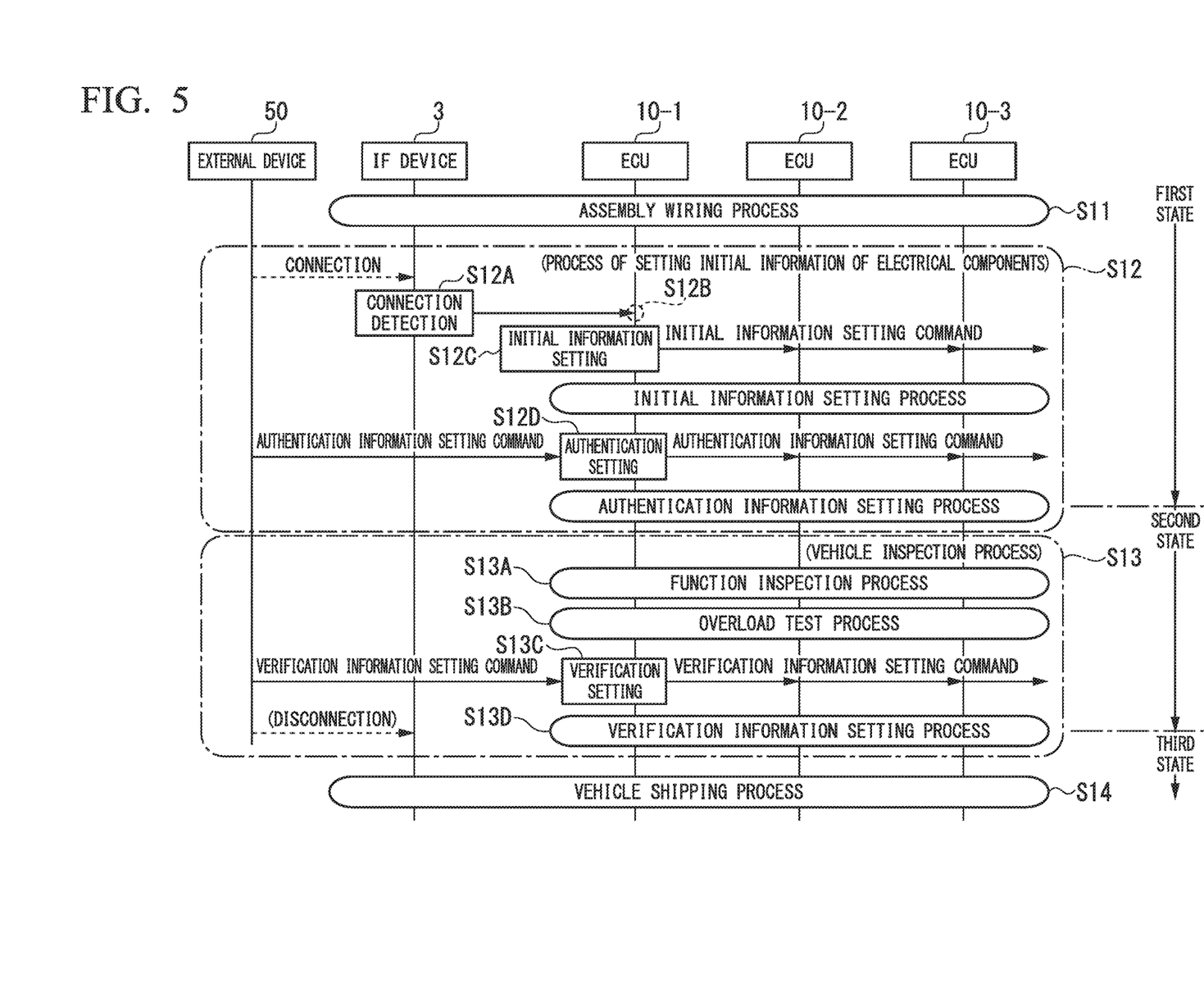
FIG. 5 is a diagram illustrating a flow of the authentication process and the verification process in the manufacturing process according to the present embodiment.

FIG. 5 is a diagram illustrating a flow of the authentication process and the verification process in the manufacturing process according to the present embodiment.

At least one of the ECUs 10 in the vehicle 5 communicates with the external device 50 and the ECU 10 notifies another ECUs 10 within the communication system 1 of the communication. Each ECU 10 controls the execution of the authentication process and the verification process on the basis of information acquired from the external device 50. For example, in the present embodiment, the ECU 10-1 will be described as communicating with the external device 50.

(1) Assembly Wiring Process

First, parts of the vehicle 5 are assembled in the present process ("(1) assembly wiring process") (S11). The assembly wiring process includes, for example, the following processes.

A process of assembling the vehicle 5 by installing mechanical parts including the driving unit 7, an electrical component such as the communication system 1, wire harnesses, and the like at predetermined positions on the housing 6.

A process of connecting electrical components with a wire harness after the installation of each electrical component and wire harness is completed.

Also, this "assembly wiring process" does not include the step of applying electric power to the electrical components of the vehicle 5.

(2) Process of Setting Initial Information of Electrical Components

Next, when the above-described process (1) is completed, the manufacturing of the vehicle 5 proceeds to the process of setting the initial information of the electrical components (S12) through a predetermined process. In the present process ("(2) process of setting initial information of electrical components"), the vehicle 5 is controlled by the external device 50 and the initial information of the electrical components is set. For example, the present process includes the following processes.

Process of detecting connection of external device 50

After electric power is applied to each ECU 10, the interface device 3 detects that the external device 50 is connected to the communication system 1 and notifies the ECU 10-1 of the detected connection (S12A). The ECU 10-1 detects the connection (S12B).

Process of setting initial information of each ECU 10.

For example, the ECU 10-1 sets its own initial information and initial information of another ECU 10 (S12C). The initial information set in this process includes various types of information for performing basic setting of each ECU 10. Each ECU 10 in the step in which the initial information is set is in a state (an invalidated state) in which no CSS process is executed.

Process of executing CSS process.

After various types of processes are completed in the process of setting the initial information of the electrical components, the change unit 14 of the ECU 10-1 receives a command (an authentication information setting command) from the external device 50, sends the command to each of the other ECUs 10, and causes the state of each of the other ECUs 10 to transition so that each ECU 10 is in a state in which the CSS process is executed (the validated state). Further, the state of the ECU 10-1 transitions so that the state of the ECU 10-1 becomes a state in which the CSS process is executed (S12D). For example, this process is assigned to a process of the last step in the process of setting the initial information of the electrical components or a step close to the last step. Thereafter, in each ECU 10, monitoring by the CSS process is effective.

(3) Vehicle Inspection Process

Next, when the above-described process (2) is completed, the manufacturing of the vehicle 5 proceeds to a vehicle inspection process (S13) through a predetermined process. In the vehicle 5, various types of inspections are executed in the present process ("(3) vehicle inspection process"). For example, the present process includes the following processes.

Function Verification Process

A function verification process (S13A) is a process of verifying whether various types of functions including a basic operation in an ordinary time and an operation in an emergency time in the vehicle 5 operate in a mode in which performance according to a law is exhibited (a so-called statutory vehicle inspection process).

In this function verification process, it is possible to simultaneously execute inspections that do not affect each other in parallel to shorten a time required for all necessary inspections. For example, it is possible to perform the process of verifying an irradiation angle of a headlamp device and the process of verifying an operation of a braking device independently and simultaneously. However, if a plurality of inspection processes are simultaneously executed in parallel as described above, the communication load of the communication device may be higher than ordinary.

That is, according to a combination of inspections to be simultaneously executed in parallel, intervals at which transmission of communication messages from each ECU 10 is requested become shorter than ordinary, and consequently the density of communication messages to be actually transmitted may increase.

Meanwhile, as a security function of the communication system 1, the communication system 1 has a function of monitoring a transmission cycle of communication messages between the ECUs 10 and detecting communication messages transmitted at intervals deviating from a standard state in an abnormal state (a cycle abnormality detection function). Thus, when this function is in an activated state, there is a risk of frequent detection of an abnormal state in the function verification process. Thus, in the ECU 10 in this step, the policy information 121 is set to inactivate the cycle abnormality detection function.

Next, after various types of processes in the function verification process on the communication system 1 are completed, the change unit 14 of the ECU 10-1 receives a command (a verification information setting command) from the external device 50 (S13C), and writes the command to the policy information 121 (verification information). The change unit 14 sends a command to each of the other ECUs 10 and causes the state of each of the other ECUs 10 to transition so that each of the other ECUs 10 is in a state in which a cycle abnormality is detected (an activated state of the cycle abnormality detection function) (S13D). Further, the ECU 10-1 causes its own state to transition so that the cycle abnormality detection function is activated.

In this manner, the communication system 1 changes the policy information 121 when the function verification process is executed and causes the cycle abnormality detection function to transition from an inactivated state to an activated state, so that the original cycle abnormality detection function of the vehicle 5 is validated. For example, the ECU 10 may invalidate the cycle abnormality detection function in part or all of the vehicle inspection process, and change a determination level of the verification process so that the cycle abnormality detection function is activated in the step in which the function verification process is completed.

The vehicle 5 having a successful inspection for each process described above is shipped as a product (S14).

If the function verification process is executed in the above-described procedure, the ECU 10 can efficiently execute verification in the communication system 1 without delaying the verification process by detecting that a transmission cycle is shortened due to an increase in the processing load in the function verification process as an abnormal state.

Figure 6:
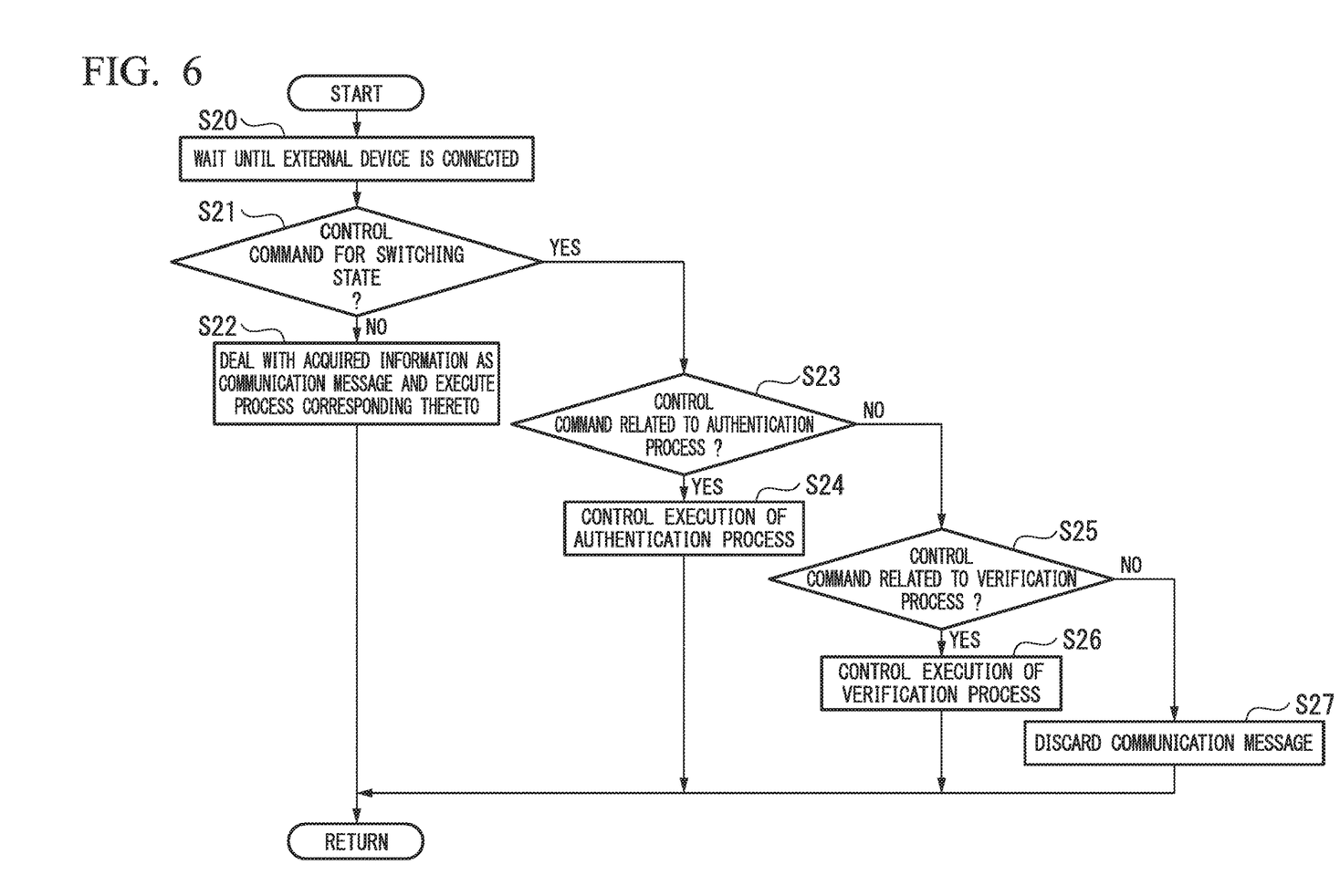
FIG. 6 is a flowchart of the authentication process and the verification process in the manufacturing process according to the embodiment.

FIG. 6 is a flowchart of the authentication process and the verification process in the manufacturing process according to the embodiment. The above-described process executed by the ECU 10-1 will be described.

After electric power is supplied to the communication system 1, the ECU 10-1 waits until a notification indicating that the external device 50 is connected is received via the interface device 3 (S20).

After the notification indicating that the external device 50 is connected is received, the ECU 10-1 determines whether or not information acquired from the external device 50 is a control command for switching the state (S21).

When it is determined that the information is not a control command for switching the state according to the determination of S21 (S21: No), the ECU 10-1 determines that the acquired information is a communication message and executes a process corresponding to the communication message (S22). This communication message may include initialization information and its setting instruction. Thereafter, the ECU 10-1 completes a series of processes illustrated in FIG. 6.

When it is determined that the information is a control command for switching the state according to the determination of S21 (S21: Yes), the ECU 10-1 determines whether or not the acquired control command (communication message) is related to an authentication process (S23).

If it is determined that the acquired control command is related to the authentication process according to the determination of S23 (S23: Yes), the ECU 10-1 controls the execution of the authentication process according to the acquired control command (S24). For example, the change unit 14 of the ECU 10-1 rewrites the policy information 121 to cause a control state to transition from a state in which the authentication process is not executed to a state in which the authentication process is executed. Thereafter, the ECU 10-1 completes the series of processes illustrated in FIG. 6.

When it is determined that the acquired control command is not related to the authentication process according to the determination of S23 (S23: No), the ECU 10-1 determines whether or not the acquired control command (communication message) is related to a verification process (S25).

If it is determined that the acquired control command is related to the verification process according to the determination of S25 (S25: Yes), the ECU 10-1 controls execution of the verification process in accordance with the acquired control command (S26). For example, the change unit 14 of the ECU 10-1 rewrites policy information 121 to cause the control state to transition from a state in which the verification process is not executed to a state in which the verification process is executed. Thereafter, the ECU 10-1 completes the series of processes illustrated in FIG. 6.

When it is determined that the acquired control command is not related to the verification process according to the determination of S25 (S25: No), the ECU 10-1 discards the acquired control command (S27). Thereafter, the ECU 10-1 completes the series of processes illustrated in FIG. 6.

Through the above-described process, the ECU 10-1 changes policy information 121 related to each process of the ECU 10-1 and another ECU 10 for both the authentication process and the verification process, and changes details to be executed during the manufacturing process.

According to the embodiment, the communication system 1 includes the ECU 10 configured to execute a process related to the cyber security solution in accordance with the policy information 121 defining execution details of the process related to the cyber security solution. In the communication system 1, the change unit 14 configured to change the policy information 121 is provided within the ECU 10. The change unit 14 changes the policy information 121 after a state of the ECU 10 in a process of manufacturing the communication system 1 transitions from a first state where the ECU 10 is mounted to the communication system 1 to a second state where a predetermined process is executed thereafter so that the execution details of the process related to the cyber security solution in the second state are expanded more than the execution details in the first state. Thereby, the communication system 1 can more easily set a security policy in the manufacturing process.

The communication system 1 also includes the storage unit 12 configured to store the policy information 121 defining details of a process related to the cyber security solution of at least any of secret communication, message authentication, and device authentication within the ECU 10. The change unit 14 rewrites the policy information 121 in the process of manufacturing the communication system 1. Thereby, the communication system 1 can adjust details of the process related to the cyber security solution.

Also, the ECU 10 adjusts whether or not to execute message authentication for communication with another ECU 10 and monitoring of an improper state based on the number of received signals detected in the above-described communication. It is only necessary for the ECU 10 to execute message authentication for communication with at least another ECU 10 and monitoring of an improper state based on the number of received signals detected in the above-described communication as the process related to the cyber security solution. Thereby, the communication system 1 can execute message authentication for communication with another ECU 10 and monitoring of an improper state based on the number of received signals detected in the above-described communication as the process related to the cyber security solution.

Also, the ECU 10 includes the monitoring unit 15 configured to monitor the improper state in the communication on the basis of the number of signals of the communication, so that it is possible to monitor the improper state in the communication based on the number of signals of the communication.

Also, because the communication system 1 is formed to include a plurality of ECUs 10 mounted in a common housing 6, it is also possible to move the plurality of ECUs 10 with the movement of the housing 6.

Also, the vehicle 5 includes the communication system 1 and the driving unit 7 configured to drive the housing 6 in which the communication system 1 is mounted, so that it is possible to perform movement according to a driving force of the driving unit 7. Also, the vehicle 5 is an example of a moving object and the present invention is not limited thereto.

Modified Example 1 of First Embodiment

The ECU 10 shown in this modified example can execute at least secret communication with another ECU 10 as a CSS process.

In this case, the change unit 14 changes policy information 121 so that secret communication is added to execution details after transition to a state in which a process of writing encryption information for the secret communication to the storage unit 12 is completed. Thereby, the ECU 10 can execute the secret communication with another ECU 10 by adjusting the approval or disapproval of execution of the secret communication with the other ECU 10.

Modified Example 2 of First Embodiment

The ECU 10 shown in this modified example can execute at least message authentication for communication with another ECU 10 as a CSS process.

In this case, the change unit 14 changes policy information 121 so that message authentication is added to execution details after transition to a state in which a process of writing authentication information for the message authentication to the storage unit 12 is completed. Thereby, the ECU 10 can execute the message authentication for communication with another ECU 10 by adjusting the approval or disapproval of execution of the message authentication with the other ECU 10.

Modified Example 3 of First Embodiment

The ECU 10 shown in this modified example can execute at least device authentication on another ECU 10 as a CSS process.

In this case, the change unit 14 changes policy information 121 so that device authentication is added to execution details after transition to a state in which a process of writing authentication information for the device authentication to the storage unit 12 is completed. Thereby, the ECU 10 can execute the device authentication with another ECU 10 by adjusting the approval or disapproval of execution of the device authentication with the other ECU 10.

Also, as shown in the above-described modified examples from "Modified example 1 of first embodiment" to "Modified example 3 of first embodiment," the change in the state of the CSS process is executed for each of details thereof. As described in the "first embodiment," it is also possible to change the state related to a plurality of details of the CSS process at the same timing. A timing at which the number of details and the state of the CSS process are changed is not limited.

Modified Example 4 of First Embodiment

As a process related to the cyber security solution, for example, the ECU 10 shown in this modified example can execute message authentication for communication with another ECU 10 and monitoring of an improper state based on the number of received signals detected in the above-described communication.

In this case, the change unit 14 changes policy information 121 so that message authentication is added to the execution details after transition to a state in which a process of writing authentication information for the message authentication to the storage unit 12 is completed. Thereafter, an inspection process is executed after the transition to the state in which the process of writing the authentication information for the message authentication to the storage unit 12 is completed. The change unit 14 further changes the policy information 121 so that monitoring of an improper state in the communication is added to execution details after the transition to the state in which the inspection process to be executed is completed. Thereby, the ECU 10 can execute the message authentication and the monitoring of the improper state with another ECU 10 by adjusting the approval or disapproval of execution of the message authentication and the monitoring of the improper state with the other ECU 10.

Modified Example 5 of First Embodiment

Although the ECU 10 receives and processes commands for the authentication process and the verification process from the external device in the first embodiment, the interface device (IF device) 3 may receive the commands for the above-described authentication process and verification process and change the policy information 121 instead thereof.

Also, the interface device 3 may perform the device authentication on the external device independently of the command for the authentication process.

Second Embodiment

Next, a second embodiment will be described. In the first embodiment, a case in which a communication system 1 is formed to include a plurality of ECUs 10 mounted in a common housing 6 has been described. Alternatively, the plurality of ECUs 10 may be configured to have independent housings, respectively. Although there is a difference in that each ECU 10 has an independent housing, the configuration of each ECU 10 is assumed to be based on the first embodiment.

According to the above-described second embodiment, in addition to achieving effects similar to those of the first embodiment, each ECU 10 is mounted in an independent housing 6 and each ECU 10 can independently move according to movement of the housing 6.

For example, if each ECU 10 can communicate with the external device 50, initial setting information can be registered from the external device 50 to each ECU 10. Thereby, the initial setting information is written to the storage unit 12 of the ECU 10 before assembly in the vehicle 5.

As described above, the communication system 1 can perform part of the manufacturing process in the ECU 10 before the communication system 1 is mounted in the vehicle 5. For example, the communication system 1 may execute the manufacturing process before mounting in the vehicle 5 in parallel with an assembly process of the vehicle 5.

As described above, it is possible to perform part of the manufacturing process in an order different from that of the first embodiment.

According to the present embodiment, in addition to achieving effects similar to those of the first embodiment, the present invention is also applicable to an assembly process in which the ECU 10 in which at least part or all of the initialization information is set is arranged in the vehicle 5.

According to at least one embodiment described above, the communication system includes a communication device configured to execute a process related to a cyber security solution in accordance with policy information defining execution details of a process related to the cyber security solution.

The communication system includes a change unit configured to change the policy information. The change unit may change the policy information so that execution details of a process related to the cyber security solution in a second state are expanded more than execution details in a first state after a state of the communication device in a process of manufacturing the communication system transitions from the first state in which the communication device is mounted to the second state in which a predetermined process is executed thereafter. Thereby, the communication system can more easily set the security policy in the manufacturing process.

Although modes for carrying out the present invention have been described above using embodiments, the present invention is not limited to these embodiments at all and various modifications and substitutions can be made without departing from the spirit and scope of the present invention.

For example, the vehicle 5 is an example of a moving object, and the present invention is not limited thereto. Alternatively, the moving object may be a self-propelled robot, a flying object, or the like.

What is claimed is:

1. A communication system including a communication device configured to execute a process related to a cyber security solution in accordance with policy information defining execution details of the process related to the cyber security solution, the communication system comprising:
   a processor configured to:
   change the policy information, wherein the processor facilitates a communication with another communication device to execute the process related to the cyber security solution and monitors for an improper state based on a number of received signals detected in the communication,
   wherein the processor changes the policy information in response to a transition of a state of the communication device in a process of manufacturing the communication system from a first state where the communication device is physically connected to the communication system to a second state where a process of writing information for the process related to the cyber security solution of a storage device is complete so that the process related to the cyber security solution in the second state is added to the execution details, and
   wherein the processor is further configured to change the policy information, subsequent to the transition of the state of the communication device in the process of manufacturing the communication system, transition to a state where an inspection process, which is executed in response to the transition to the second state, is completed, so that the monitoring of the improper state in the communication is added to the execution details.

2. The communication system according to claim 1, wherein the processor is configured to:
   store the policy information defining details of the process related to the cyber security solution of at least any of secret communication, message authentication, and device authentication, and
   rewrite the policy information in the process of manufacturing the communication system.

3. The communication system according to claim 1, wherein the communication device is able to execute secret communication with another communication device as the process related to the cyber security solution, and
   wherein the processor is configured to change the policy information so that the secret communication is added to execution details after transition to a state in which a process of writing encryption information for the secret communication to the storage device is completed.

4. The communication system according to claim 1, wherein the communication device is able to execute message authentication for communication with another communication device as the process related to the cyber security solution, and
   wherein the processor is configured to change the policy information so that the message authentication is added to execution details after transition to a state in which a process of writing authentication information for the message authentication to the storage device is completed.

5. The communication system according to claim 1, wherein the communication device is able to execute device authentication on another communication device as the process related to the cyber security solution, and
   wherein the processor is configured to change the policy information so that the device authentication is added to execution details after transition to a state in which a process of writing authentication information for the device authentication to the storage device is completed.

6. The communication system according to claim 1, wherein the communication device is mounted in a vehicle and is able to execute monitoring of an improper state based on a number of received signals detected in the communication as the cyber security solution, and
   wherein the processor is further configured to change the policy information so that the monitoring of the improper state in the communication is added to execution details after transition to a state in which a process of inspecting the vehicle is completed.

7. The communication system according to claim 1, wherein the communication device is able to execute message authentication for communication with another communication device and monitoring of an improper state based on a number of received signals detected in the communication as the process related to the cyber security solution, wherein the processor is further configured to change the policy information so that the message authentication is added to execution details after transition to a state in which a process of writing authentication information for the message authentication to the storage device is completed, and wherein the processor further changes the policy information so that the monitoring of the improper state in the communication is added to execution details after transition to a state in which an inspection process, which is executed upon completion of the transition to the state in which the process of writing the authentication information for the message authentication to the storage device, is completed.

8. The communication system according to claim 1, wherein the communication device is able to execute secret communication with another communication device and monitoring of an improper state based on a number of received signals detected in the communication as the process related to the cyber security solution, wherein the processor is further configured to change the policy information so that the secret communication is added to execution details after transition to a state in which a process of writing encryption information for the secret communication to the storage device is completed, and wherein the processor further changes the policy information so that the monitoring of the improper state in the communication is added to execution details after transition to a state in which an inspection process, which is executed upon completion of the transition to the state in which the process of writing the encryption information for the secret communication to the storage device, is completed.

9. The communication system according to claim 1, wherein the communication device is able to execute device authentication on another communication device and monitoring of an improper state based on a number of received signals detected in the communication as the process related to the cyber security solution, wherein the processor is further configured to change the policy information so that the device authentication on the other communication device is added to execution details after transition to a state in which a process of writing authentication information for the device authentication to the storage device is completed, and wherein the processor further changes the policy information so that the monitoring of the improper state in the communication is added to execution details after transition to a state in which an inspection process, which is executed upon completion of the transition to the state in which the process of writing the authentication information for the device authentication to the storage device, is completed.

10. The communication system according to claim 1, wherein the processor is further configured to:
  monitor an improper state in communication of the communication device based on a number of communication signals of the communication device.

11. The communication system according to claim 1, comprising:
  a plurality of communication devices mounted in a common housing.

12. A moving object comprising:
  the communication system according to claim 1;
  wherein the communication system is mounted in a housing.

13. A communication method for use in a communication system including a communication device configured to execute a process related to a cyber security solution in accordance with policy information defining execution details of the process related to the cyber security solution, the communication method comprising:
  facilitating a communication with another communication device to execute the process related to the cyber security solution;
  monitoring for an improper state based on a number of received signals detected in the communication;
  changing the policy information in response to a transition of a state of the communication device in a process of manufacturing the communication system from a first state where the communication device is physically connected to the communication system to a second state where a process of writing information for the process related to the cyber security solution to a storage device is completed so that the process related to the cyber security solution in the second state is added to the execution details; and
  chancing the policy information, subsequent to the state of the communication device in the process of manufacturing the communication system transitioning to a state where an inspection process, which is executed after the transitioning to the second state, is completed, so that the monitoring of the improper state in the communication is added to the execution details.

* * * * *